US006961777B1

(12) United States Patent
Hariharasubrahmanian (10) Patent No.: US 6,961,777 B1
(45) Date of Patent: *Nov. 1, 2005

(54) SYSTEMS AND METHODS FOR PREDICTING FIELDS IN A DATA PACKET

(76) Inventor: Shrikumar Hariharasubrahmanian, 1381 S. East St., Amherst, MA (US) 01002

( * ) Notice: Subject to any disclaimer, the term of this patent is extended or adjusted under 35 U.S.C. 154(b) by 580 days.

This patent is subject to a terminal disclaimer.

(21) Appl. No.: 09/632,846

(22) Filed: Aug. 4, 2000

Related U.S. Application Data (60) Provisional application No. 60/147,654, filed on Aug. 6, 1999.

(51) Int. Cl.[7] .............................................. G06F 15/16
(52) U.S. Cl. ...................... 709/230; 709/232; 370/389
(58) Field of Search ............................... 709/230–233, 709/236, 237; 370/389, 392, 498

(56) References Cited

U.S. PATENT DOCUMENTS

| | | | | |
|---|---|---|---|---|
| 5,056,058 A | * | 10/1991 | Hirata et al. ................. | 709/230 |
| 5,260,942 A | * | 11/1993 | Auerbach et al. ............ | 370/474 |
| 5,678,060 A | * | 10/1997 | Yokoyama et al. .......... | 709/212 |
| 5,721,955 A | * | 2/1998 | Cedros et al. ................ | 710/33 |
| 5,752,078 A | * | 5/1998 | Delp et al. ...................... | 710/7 |
| 5,758,087 A | * | 5/1998 | Aaker et al. ................. | 709/232 |
| 5,838,720 A | * | 11/1998 | Morelli ......................... | 375/219 |
| RE36,015 E | | 12/1998 | Iu ................................. | 348/415 |
| 5,881,313 A | | 3/1999 | Ramakrishnan et al. ..... | 395/860 |
| 5,916,305 A | * | 6/1999 | Sikdar et al. ................. | 709/236 |
| 6,034,963 A | | 3/2000 | Minami et al. .............. | 370/401 |
| 6,167,480 A | * | 12/2000 | Williams et al. ............. | 710/260 |
| 6,208,651 B1 | * | 3/2001 | Van Renesse et al. ....... | 370/392 |
| 6,542,513 B1 | * | 4/2003 | Franke et al. ................ | 370/429 |
| 6,590,885 B1 | * | 7/2003 | Jorgensen ..................... | 370/338 |
| 6,721,332 B1 | * | 4/2004 | McAlear ....................... | 370/446 |
| 6,819,681 B1 | * | 11/2004 | Hariharasubrahmanian . | 370/498 |
| 2002/0003795 A1 | * | 1/2002 | Oskouy et al. .............. | 370/389 |

FOREIGN PATENT DOCUMENTS

| | | | | |
|---|---|---|---|---|
| EP | 0559595 A2 | * | 2/1993 | ........... H04L 12/56 |
| WO | WO0111834 A1 | * | 2/2001 | ........... H04L 12/56 |
| WO | WO0167272 A1 | * | 9/2001 | .......... G06F 15/173 |

OTHER PUBLICATIONS

Rekhter et al., "Cisco Systems' Tag Switching Architecture Overview," Feb. 1997, RFC 2105, pp. 1-13 (printed from ftp://ftp.rfc-editor.org/in-notes/rfc2105.txt, pp. 1-13).*
Elias, "RE: AAL5-CRC32," from http://cell-relay.indiana.edj/mhonarc/cell-relay/1992-Sep/msg00048.html, 1992.*
Lough et al., "A Short Tutorial on Wireless LANs and IEEE 802.11," from www.computer.org/students/looking/summer97/ieee802.htm?SMIDENTITY=NO.*
Internet Engineering Task Force, "Requirements for Internet Hosts—Communication Layers," RFC1122, Oct. 1989, pp. 1-115.

* cited by examiner

*Primary Examiner*—Bradley Edelman
(74) *Attorney, Agent, or Firm*—Cesari and McKenna, LLP (57) ABSTRACT

A system predicts one or more fields of a packet that includes multiple fields. Each of the fields stores a value. The system receives one or more of the fields of the packet and determines the value of at least one of the received fields (710). The system predicts a value of at least one other one of the fields of the packet based on the value of the received field before the other field is received (715). The system then processes the packet based on the received fields and the predicted field(s) (720).

57 Claims, 11 Drawing Sheets

| SOURCE PORT | DESTINATION PORT |
|---|---|
| SEQUENCE NUMBER ||
| ACKNOWLEDGE NUMBER ||
| HEADER LENGTH / RESERVED / FLAGS | WINDOW |
| CHECKSUM | URGENT POINTER |

| VERSION | HL | TYPE OF SERVICE | TOTAL LENGTH | |
|---|---|---|---|---|
| IDENTIFICATION | | | FLAGS | FRAGMENT OFFSET |
| TIME TO LIVE | | PROTOCOL | HEADER CHECKSUM | |
| SOURCE ADDRESS | | | | |
| DESTINATION ADDRESS | | | | |

SYSTEMS AND METHODS FOR PREDICTING FIELDS IN A DATA PACKET

RELATED APPLICATION

This application claims priority under 35 U.S.C. § 119 based on U.S. Provisional Application Ser. No. 60/147,654, filed Aug. 6, 1999, the disclosure of which is incorporated herein by reference.

BACKGROUND OF THE INVENTION

A. Field of the Invention

The present invention relates generally to data communication and, more particularly, to systems and methods that predict fields in packets before the entire packets are received.

B. Description of Related Art

Conventional communication networks permit communication devices, such as personal computers, servers, laptops, personal digital assistants (PDAs), and other similar devices, to communicate with one another. Sometimes, communications over these networks are governed by a packetization protocol and a corresponding packet exchange protocol that specify what the communication devices on the network must and must not do under different specific circumstances. These protocols are specified under the relevant standards, as applicable to the domains in which the communication devices operate.

Packetization and packet exchange protocols usually require that the communication devices involved in a communication process store and respond to packets in separate steps that require allocations of memory to hold and process one or more packets. A conventional technique used by a communication device includes receiving a packet, storing it in local memory, and processing it only after complete reception of the packet. This technique results in increased delays due to the time consumed in storing and processing the packet in two distinct steps. The technique also places a demand for a large enough local memory that can store the entire packet and any corresponding control information.

Some communication devices, such as mini-computers, micro-controllers, and micro-computers, operate in environments where time delays due to storage and processing of packets are unacceptable and/or lack sufficient resources to store one or more packets or perform necessary networking protocol procedures. To communicate over a packetized communication network, these devices often must associate themselves as slave devices to one or more host computers that contain the resources to perform operations on behalf of the slave devices. For example, the host computers may perform the networking protocol procedures on behalf of the slave devices, transmit information to other devices on their behalf, and perform operations on the slave devices in response to requests by network devices with which the slave devices are communicating. Such arrangements can result in delays in the processing of the packets, lead to many practical difficulties, and increase the cost of connecting the devices to the communication network.

Further, any communication device connected to a communication network performs processes for responding to a received packet. Conventional processes dictate that a communication device respond to a packet only after complete reception of the packet. This leads to delays in the generation of responses, thereby, causing inefficiencies or, in some cases, unacceptable performance.

As a result, there exists a need for mechanisms that permit communication devices that lack sufficient resources to store one or more packets and/or perform necessary networking protocol procedures to connect directly and inexpensively to a communication network. Also, a need exists for mechanisms that permit a communication device to respond to a received packet more quickly than that permitted by conventional systems.

SUMMARY OF THE INVENTION

Systems and methods consistent with the present invention address these and other needs through mechanisms that permit communication devices to predict one or more fields in packets before the fields are received, thereby using their resources efficiently and permitting the devices to respond to packets before the entire packets are received.

In accordance with the purpose of the invention as embodied and broadly described herein, a system predicts one or more fields of a packet that includes multiple fields. Each of the fields stores a value. The system receives one or more of the fields of the packet and determines the value of at least one of the received fields. The system predicts a value of at least one other one of the fields of the packet based on the value of the received field before the other field is received. The system then processes the packet based on the received fields and the predicted field(s).

In another implementation consistent with the present invention, a method for replying to packets that have multiple fields before the packets are entirely received, includes receiving one or more of the fields of the packet; predicting one or more other ones of the fields of the packet before the one or more other fields are received; generating a reply packet based on the one or more received fields and the one or more predicted fields; and transmitting the reply packet.

In yet another implementation consistent with the present invention, a computer-readable medium stores instructions executable by one or more processors to perform a method for generating responses to packets, having multiple fields, before the packets are entirely received. The method includes receiving one or more of the fields of the packet; predicting one or more other ones of the fields of the packet before the one or more other fields are received; and generating a reply packet based on the one or more received fields and the one or more predicted fields.

In a further implementation consistent with the present invention, a method processes packets having multiple fields. The method includes receiving one or more of the fields of the packet; determining a value of at least one of the received fields; predicting a value of one or more other ones of the fields of the packet based on the value of the at least one received field before the one or more other fields are received; and generating a reply packet based on the one or more received fields and the one or more predicted fields.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Systems and methods consistent with the present invention permit communication devices of limited capabilities, such as those with very restricted memory resources that are unable to store an entire or a significant portion of a packet, to process and respond to packets in accordance with network protocols. The communication devices may accomplish this feat by predicting one or more fields in a packet before the fields are received, thereby efficiently using the memory resources and permitting the communication devices to respond to packets more quickly than was conventionally permitted.

Exemplary Network

Figure 1:
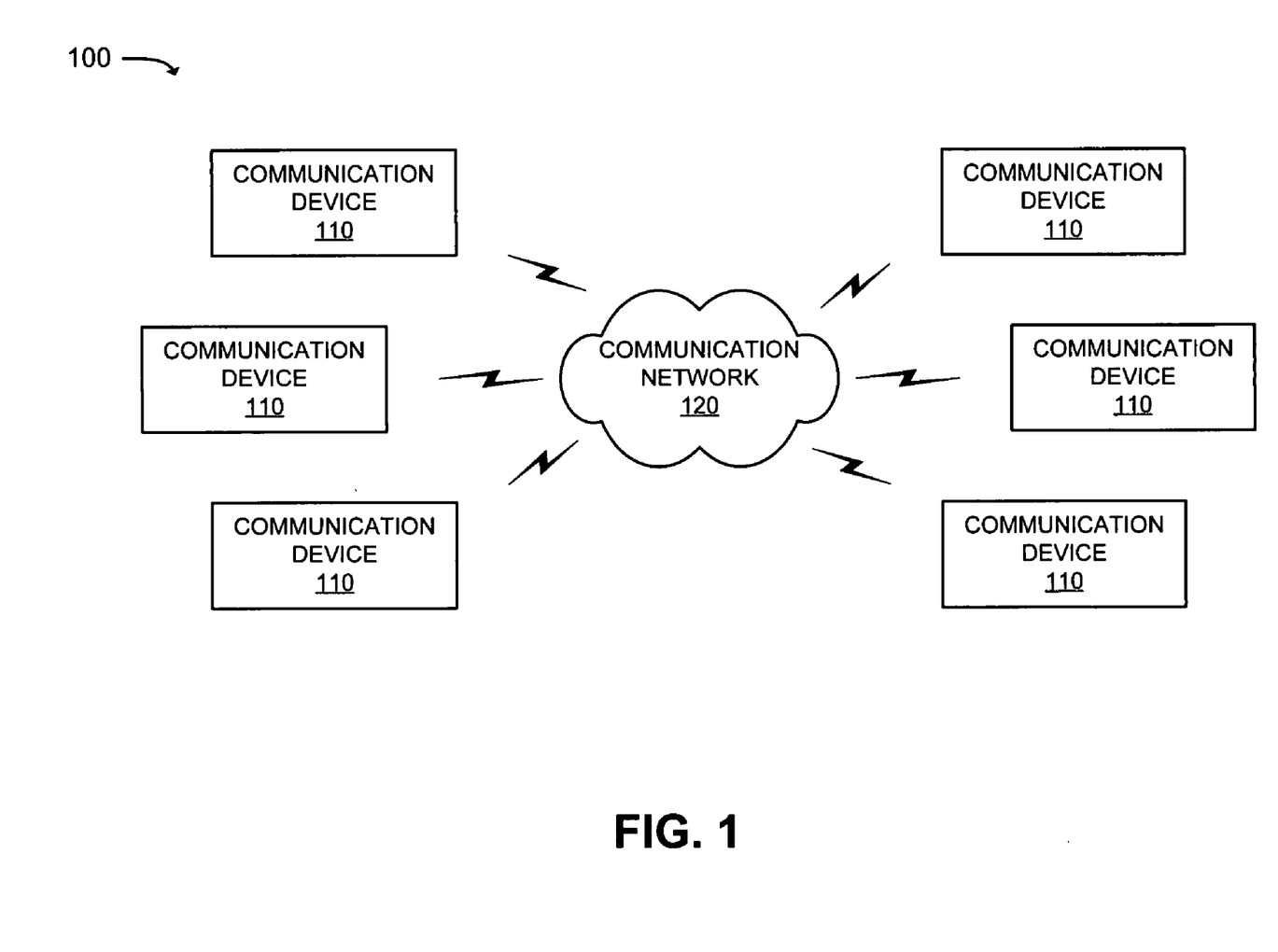
FIG. 1 is a diagram of an exemplary network in which systems and methods consistent with the present invention may be implemented.

FIG. 1 is an exemplary network 100 in which systems and methods consistent with the present invention may be implemented. The network 100 may include communication devices 110 connected to a communications network 120. Six communication devices 110 have been shown in FIG. 1 for simplicity. In practice, the network 100 may include more or less communication devices 110.

The network 120 may include one or more data communication networks, such as the Internet, an intranet, a wide area network (WAN), a local area network (LAN), or the like. In one implementation consistent with the present invention, the network 120 includes a packet-based network that operates according to a communications protocol, such as a Transmission Control Protocol and all related protocols, as specified in "Requirements for Internet Hosts—Communication Layers," RFC1122, October 1989.

Each of the communication devices 110 may include a computer device, such as a personal computer, server, laptop, personal digital assistant (PDA), etc., a computer system, such as a system or logic on a chip, an electronic device, or a similar device with or without extensive computational and/or memory resources. The communication devices 110 may connect to the network 120 via wired, wireless, or optical communication paths. In one implementation consistent with the present invention, the communication devices 110 connect to the network 120 using a data link protocol, such as the Serial Line Internet Protocol (SLIP), Ethernet, or Token Ring. The communication devices 110 may communicate over the network 120 via a virtual circuit, connection, or socket.

Figure 2:
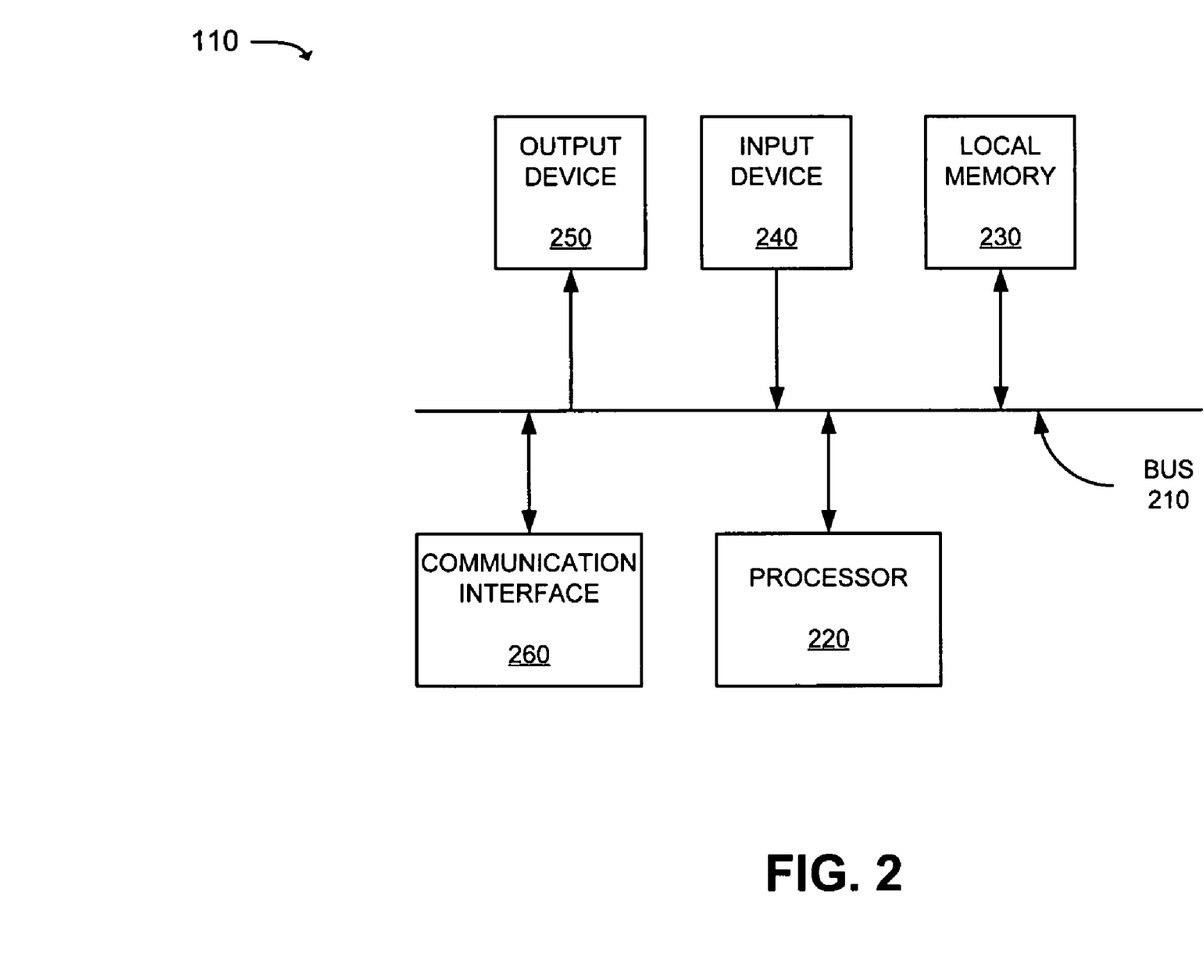
FIG. 2 is a diagram of a communication device of FIG. 1 in an implementation consistent with the present invention.

FIG. 2 is an exemplary diagram of components of a communication device 110 in an implementation consistent with the present invention. The communication device 110 may include a bus 210, a processor 220, a local memory 230, an input device 240, an output device 250, and a communication interface 260. The bus 210 may include one or more buses or conductors that connect together one or more of the components of the communication device 110. The processor 220 may be any type of conventional processor or microprocessor that interprets and executes instructions.

The local memory 230 may be a large or small capacity computer-readable medium that stores information and instructions for use by the processor 220. A computer-readable medium may include one or more memory devices, such as a random access memory (RAM), a read only memory (ROM), or another type of dynamic or static storage device, and/or carrier waves. In one implementation consistent with the present invention, the local memory 230 includes a small capacity memory device capable of storing a small amount of information, less than the information typically included in a packet.

The input device 240 may include any conventional mechanism that permits a user to input information into the communication device 110, such as a keyboard, a key pad, a mouse, a microphone, a data acquisition device, a sensor, etc. The output device 250 may include any conventional mechanism that outputs information to the user, including a display, a speaker, a transducer, an actuator, etc. The communication interface 260 may include any transceiver-like mechanism that enables the communication device 110 to communicate with the other devices and systems. For example, the communication interface 260 may include mechanisms for communicating via a network, such as the network 120.

As will be described in detail below, a communication device 110, consistent with the present invention, that contains insufficient resources to perform the necessary data packetization and transport protocol procedures may communicate over a network, such as network 120, that requires and/or mandates the use of such protocols and respond to packets before the packets have been completely received. The communication device 110 may perform these tasks in response to processor 220 executing sequences of instructions contained in a computer-readable medium, such as the local memory 230.

The instructions may be read into local memory 230 from another computer-readable medium or from another device via the communication interface 260. Execution of the sequences of instructions contained in local memory 230 causes processor 220 to perform processes that will be described later. Alternatively, hardwired circuitry may be used in place of or in combination with software instructions to implement processes consistent with the present invention. For example, the components of the communication device 110 may be fully implemented in silicon via a combination of logic gates. Thus, the present invention is not limited to any specific combination of hardware circuitry and software.

Exemplary Communication Protocol

Figure 3:
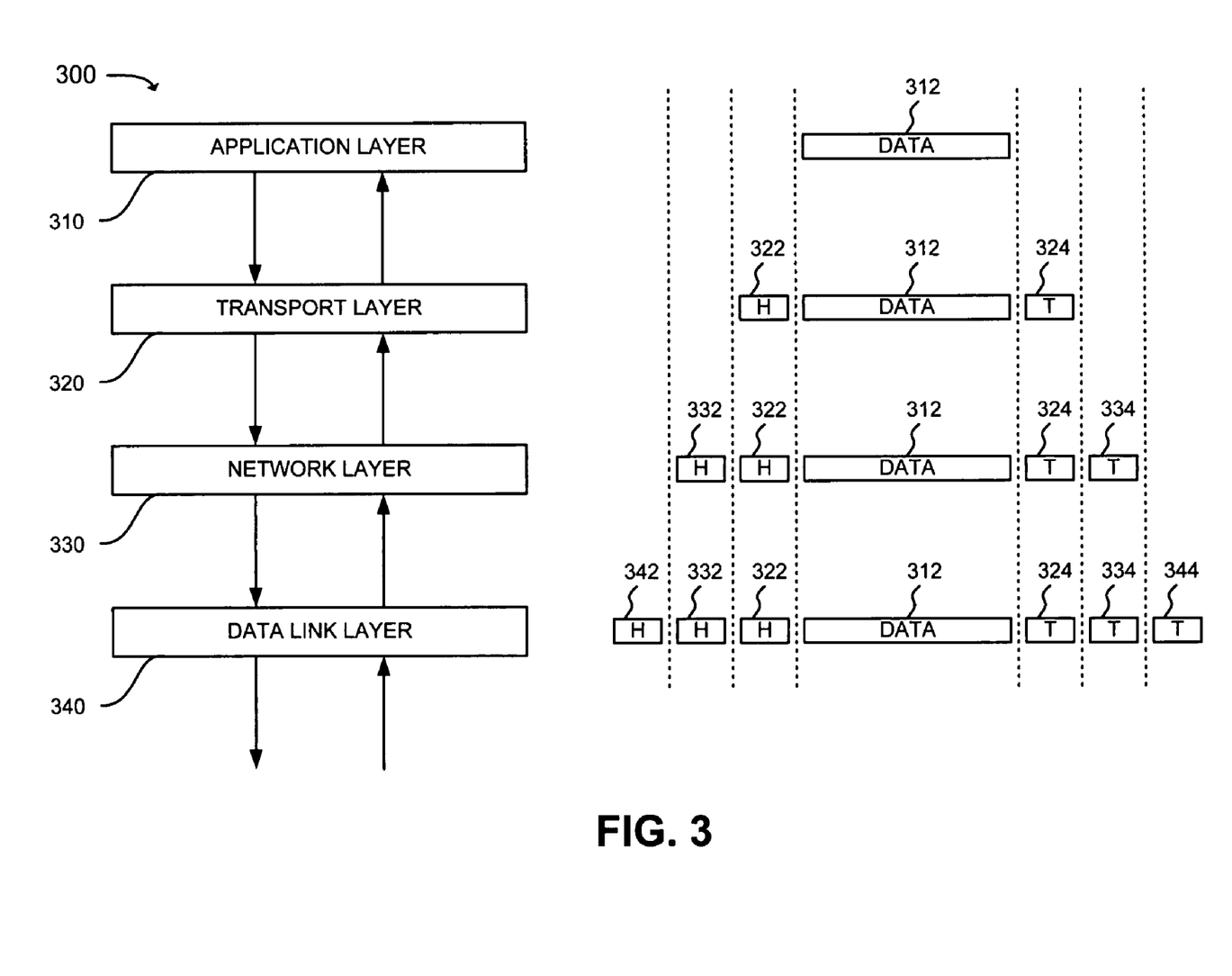
FIG. 3 is an exemplary diagram of a communications protocol used by a communication device of FIG. 1 in an implementation consistent with the present invention.

FIG. 3 is an exemplary diagram of a communications protocol 300 used by a communications device 110 in an implementation consistent with the present invention. The communications protocol 300 includes an application layer 310, a transport layer 320, a network layer 330, and a data link layer 340. The application layer 310 may include the applications or programs that initiate the communication. The application layer 310 may include several a application layer protocols for mail, file transfer, remote access, authentication, and name resolution. The application layer 310 may deliver data 312 to the communication network by passing data of a packet to the transport layer 320 along with the socket of the destination of the packet.

The transport layer 320 may establish a virtual circuit, a connection, or a socket between the source and destination of the packet. The transport layer 320 may attach a header 322 and trailer 324 onto the packet in accordance with the specifications of the relevant transport protocol. The transport layer 320 passes the packet to the network layer 330 along with the IP address of the destination.

The network layer 330 may accept the packet from the transport layer 320 and prepare the packet for the data link layer 340 by converting the IP address into a physical address, such as a Media Access Control (MAC) address, and fragmenting the packet, if necessary, into the required sizes. The network layer 330 may generate packets called datagrams by attaching an IP header 332 and trailer 334 onto the packets from the transport layer 320 in accordance with the specifications of the relevant protocol. The network layer 330 passes the datagram to the data link layer 340.

The data link layer 340 may include a data link protocol, such as Ethernet, Token Ring, Asynchronous Transfer Mode (ATM), Fiber Distributed Data Interface (FDDI), Synchronous Optical Network (SONET), or X.25, that is responsible for reliably moving the data across the communications network 120. The data link layer 340 converts the datagram into its own format, which may include adding a header 342 that includes source and destination MAC addresses and a trailer 344 that includes checksum data.

Figure 4:
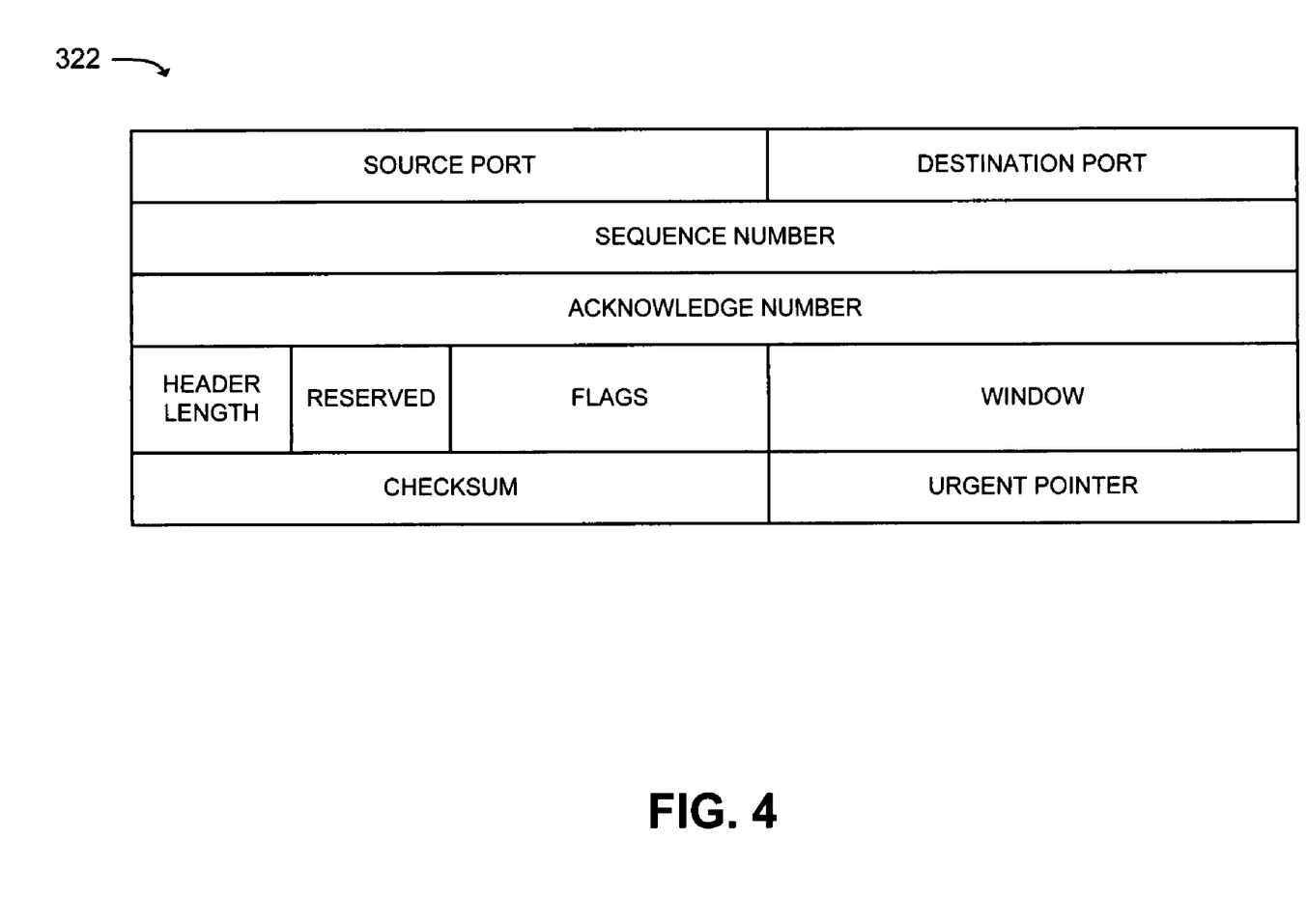
FIGS. 4–6 are detailed diagrams of the headers of FIG. 3 in an implementation consistent with the present invention.
Figure 5:
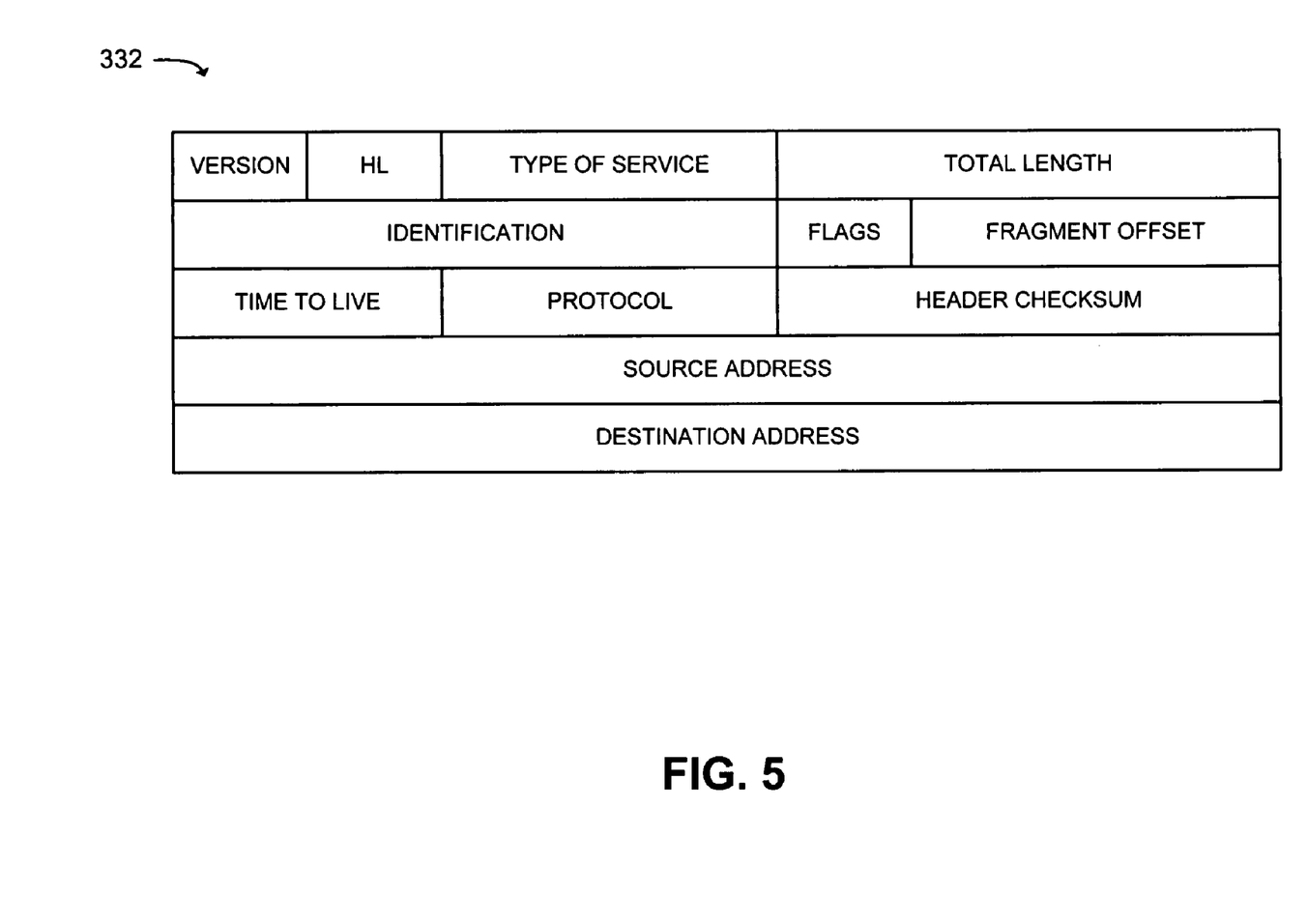
Figure 6:
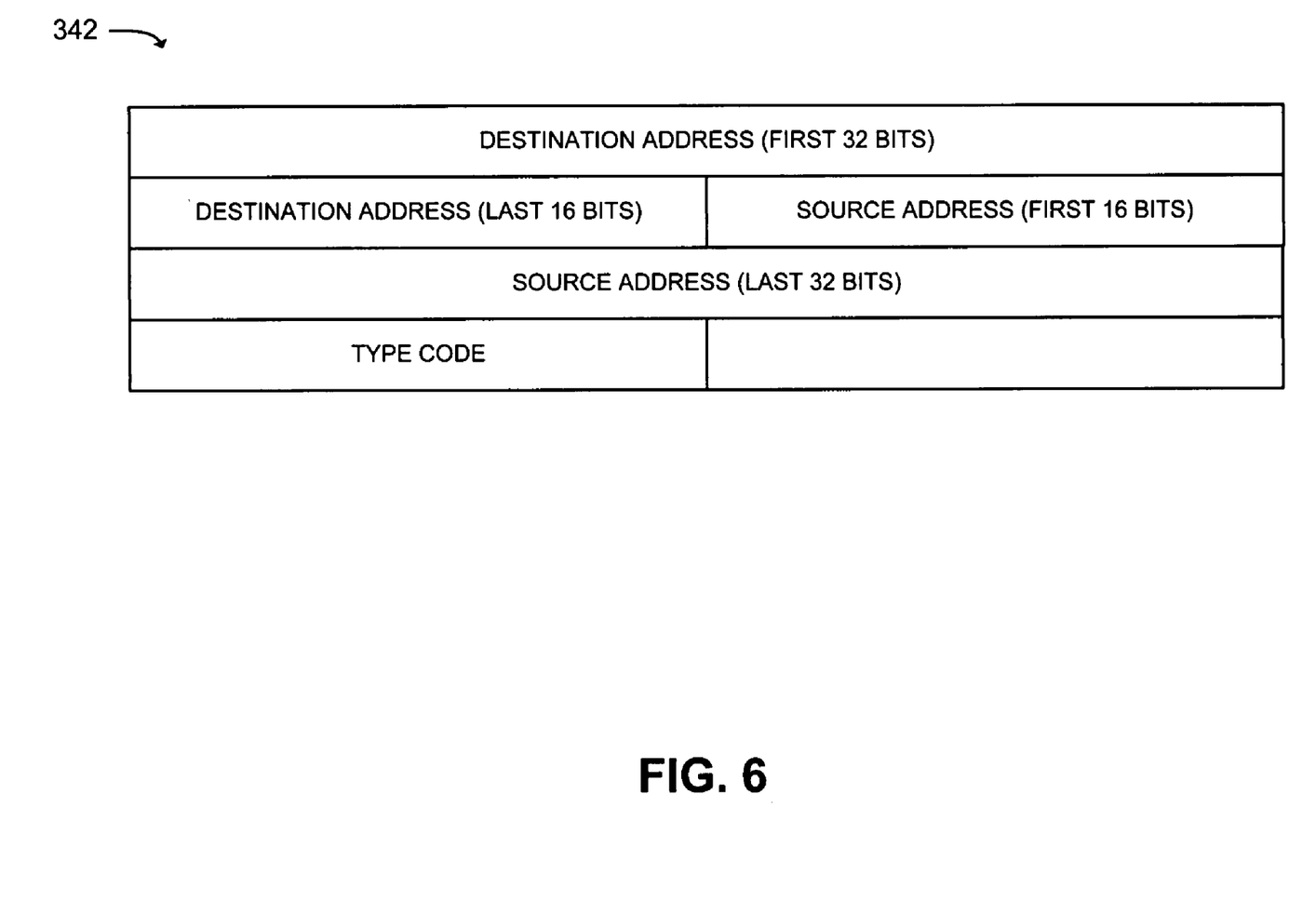

FIGS. 4–6 are detailed diagrams of the headers 322–342, respectively, in an implementation consistent with the present invention. As shown in FIG. 4, the header 322 includes a source port field, a destination port field, a sequence number field, an acknowledge number field, a header length field, a reserved field, a flags field, a window field, a checksum field, and an urgent pointer field. The source port and destination port fields include data that identify the source and destination of a data packet. The sequence number field includes data used to assure the order and delivery of the packet at the destination. The acknowledge field includes data that identifies the next byte of data that the source expects to receive from the destination.

The header length field includes data that identifies the length of the header 322. The reserved field may be used for future expansions. The flags field may include several flags, such as urgent, acknowledge, push, reset, synchronize, and finish flags. The urgent flag indicates whether the data in the urgent pointer field is valid. The acknowledge flag indicates whether the data in the acknowledgement number field is valid. The push flag indicates whether the accompanying data should be passed to the application at the destination in an expedited manner. The reset flag indicates whether the connection should be reset. The synchronize flag is used to establish an initial agreement on the sequence numbers. The finish flag indicates whether the source has finished sending data.

The window field includes data that identifies the amount of space the destination has available for storage of unacknowledged data. The checksum field includes a checksum value that may cover both the header 322 and the data 312.

The urgent pointer field includes data that identifies whether this packet should take priority over the normal data stream.

Referring to FIG. 5, the header 332 includes a version field, a header length field, a type of service field, a total length field, an identification field, a flags field, a fragment offset field, a time to live field, a protocol field, a header checksum field, a source address, and a destination address. The version field includes data that identifies the version of the protocol being used. The header length field includes data that identifies the length of the header 332. The type of service field includes data that identifies the quality of service to be given to the datagram by the network 120.

The total length field includes data that identifies the length of the datagram (i.e., the headers 322 and 332 and data 312). The identification field includes data used to reassemble a fragmented datagram at the destination. The flags field may include one or more flags that identify, for example, whether the datagram may be fragmented. The fragment offset field includes data that identifies the starting point in relation to the start of the original sent packet.

The time to live field includes a count value that identifies the number of hops/links over which the packet may be routed. The protocol field includes data that identifies the type of transport protocol (e.g., Internet Control Message Protocol (ICMP), Internet Group Management Protocol (IGMP), Transmission Control Protocol, or User Datagram Protocol (UDP)) to be used on the datagram at the destination. The header checksum field includes a checksum value that covers the header 332. The source and destination address fields include addresses, such as Internet addresses, of the source and destination, respectively.

Referring to FIG. 6, the header 342 includes a destination address field, a source address field, and a type code field. The source and destination address fields include addresses, such as Ethernet addresses, for the source and destination, respectively. The type code field includes data that identifies the data link protocol used to connect the source and destination.

A communication device 110, consistent with the present invention, may predict the value of some header fields in a packet based on the values of one or more other header fields. In other words, the communication device 110 may determine the value of some header fields before the header fields are received based on the values of one or more header fields that have already been received. This may be accomplished because the packets received by the communication device 110 have a useful correlation, or correlations, between some fields that have already been received and some other fields in the packet that have yet to arrive. These correlations may either be incidental in the regular operation of the communications protocol and can be observed by analysis of the protocol specifications or may be arranged to occur by specific design.

In the latter case, some elements of the application layer 310 using the transport connection may be arranged to have certain properties constraining their design and selection in a manner that makes the advance determination of packet fields with adequate certainty feasible. For example, suppose that the length of a request query from the application layer 310 is constrained by design to be more than a minimum length, such as at least 19 characters long, so that any packet containing such a request can be identified as such with sufficient certainty, based on examination of a packet length field received early in the reception of the packet.

Further, the transport layer procedure of acknowledging the data received may be modified in such a manner that the transport layer 320 only acknowledges a fraction of the data received. In this case, the data may be retransmitted after an applicable timeout period. As a result, subsequent packets on the same virtual circuit, connection, or socket, including, for example, retransmissions of data that is outstanding as not acknowledged, may have lower bounds on their length. In other words, packets other than the first few packets and the last few packets on the same virtual circuit, connection, or socket may have a packet length that is adequately distinguished from the packet length of the first few and last few packets. Therefore, the first and last few packets may be identified based on the packet length field.

Exemplary Processing

Figure 7A:
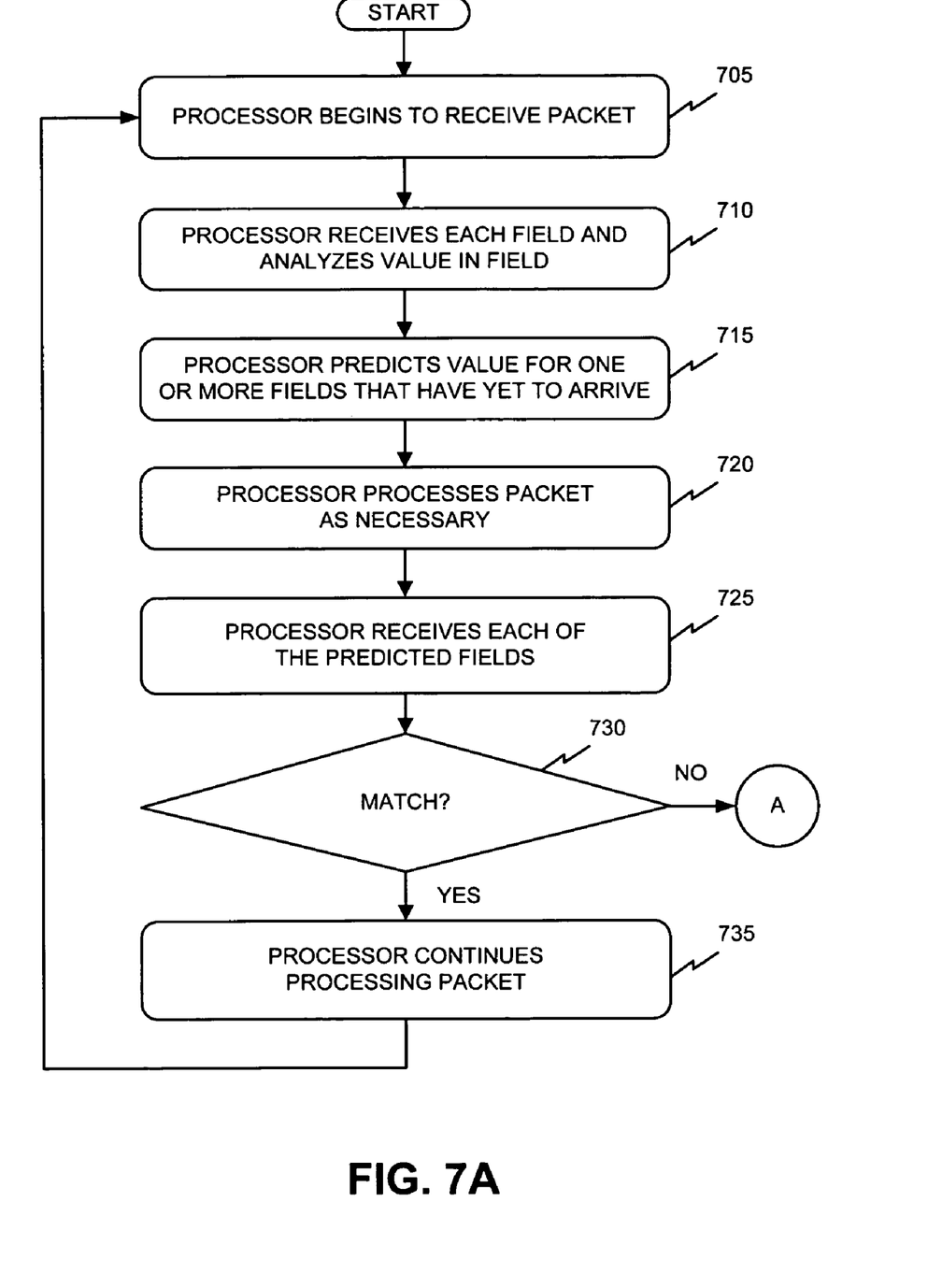
FIGS. 7A and 7B are flowcharts of processing for predicting fields of a received packet in accordance with an implementation consistent with the present invention.
Figure 7B:
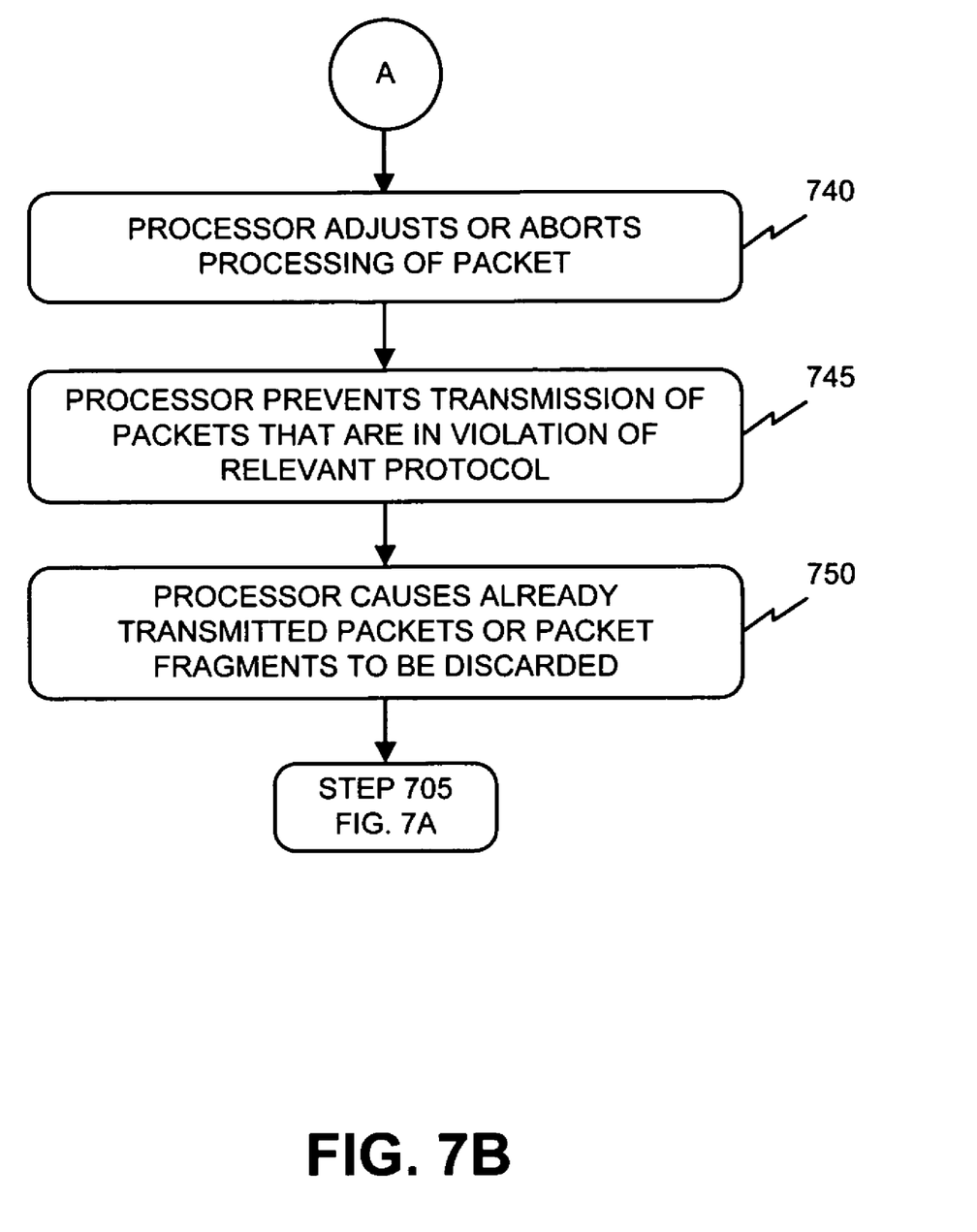
Figure 8:
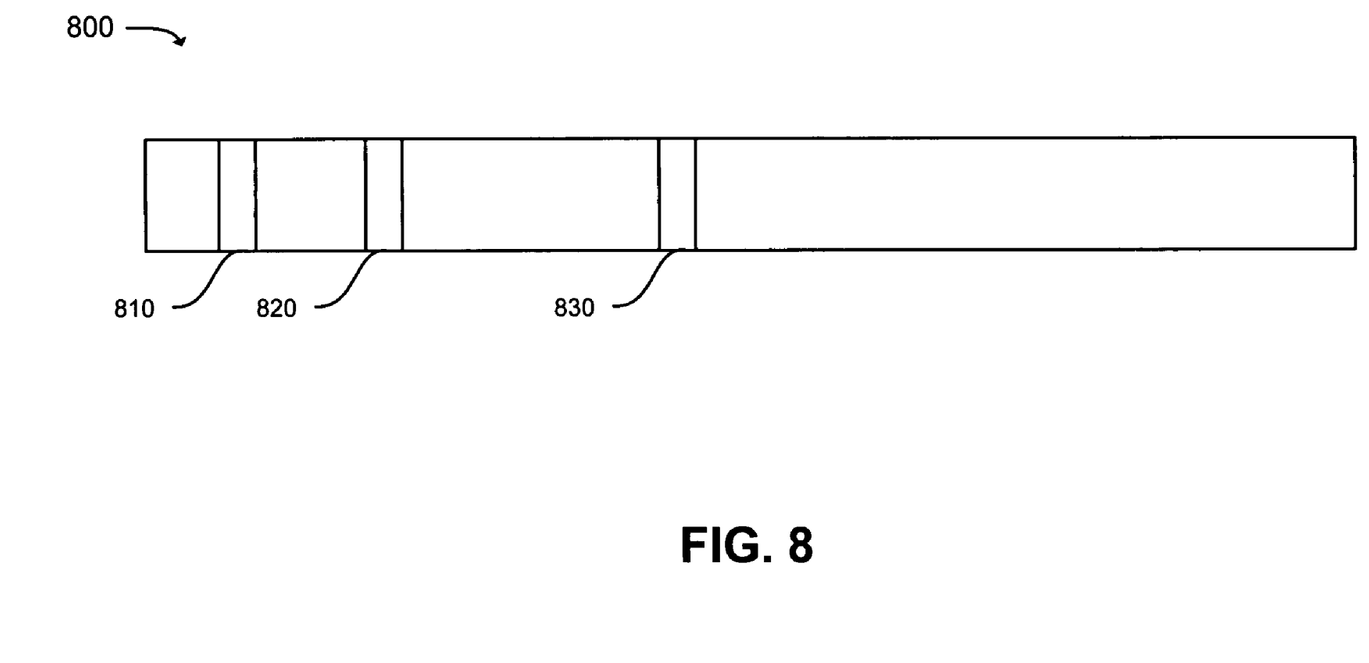
FIG. 8 is an exemplary diagram of a packet in an implementation consistent with the present invention.

FIGS. 7A and 7B are flowcharts of processing for predicting fields of a received packet in accordance with an implementation consistent with the present invention. To facilitate the discussion that follows, assume that the communication device 110 receives the packet illustrated in FIG. 8. FIG. 8 is an exemplary diagram of a packet 800 in an implementation consistent with the present invention. The packet 800 includes multiple fields, including fields 810, 820, and 830. Assume that the communication device 110 predicts fields 820 and 830 based on field 810.

Processing may begin when the communication device 110 starts to receive the packet 800 from, for example, another communication device 110 on the network 120 [step 705]. During this time the communication device 110 may receive the initial packet framing bytes and the fields prior to field 820. The processor 220 (FIG. 2), for example, within the communication device 110 receives each field of the packet 800 and analyzes the value in the fields [step 710].

When the processor 220 receives field 810, it analyzes the value in field 810 and predicts the values for one or more fields that have yet to arrive, such as fields 820 and 830 [step 715]. In one implementation consistent with the present invention, field 810 is the total length field within the header 332 (FIG. 5), field 820 is the protocol field within the header 332, and field 830 is the flags field, including acknowledge, synchronize, and finish flags within the header 322 (FIG. 4). The processor 220 may make its predictions based on the following rules:

Protocol Field 820:
  If the value in the total length field 810 is less than or equal to 39, then the value in the protocol field 820 identifies ICMP as the transport protocol to be used on the packet at the destination.
  If the value in the total length field 810 is any other value (i.e., greater than 39), then the value in the protocol field 820 identifies UDP or Transmission Control Protocol as the transport protocol to be used on the packet at the destination.

Flags Field 830:
  If the value in the total length field 810 is less than or equal to 58, but greater than 39, then the value of the synchronize flag indicates that the sequence numbers are to be synchronized to begin a connection, the value of the acknowledge flag indicates that the acknowledgement number field is not being used, and the value of the finish flag indicates that more data will be received.
  If the value in the total length field 810 is equal to or greater than 59, then the value of the synchronize flag indicates that the sequence numbers are not to be synchronized to begin a connection.

In other implementations consistent with the present invention, other fields and rules may be used. The processor 220 may record its predictions in any suitable, efficient manner.

The processor 220 then processes the packet as necessary in accordance with the predictions [step 720]. For example, the processor 220 may begin preparing a reply packet based on the received and predicted fields and begin transmitting the reply packet to the destination (e.g., a communication device 110). In addition, the processor 220 may confirm earlier predictions based on values of one or more other fields.

Figure 9:
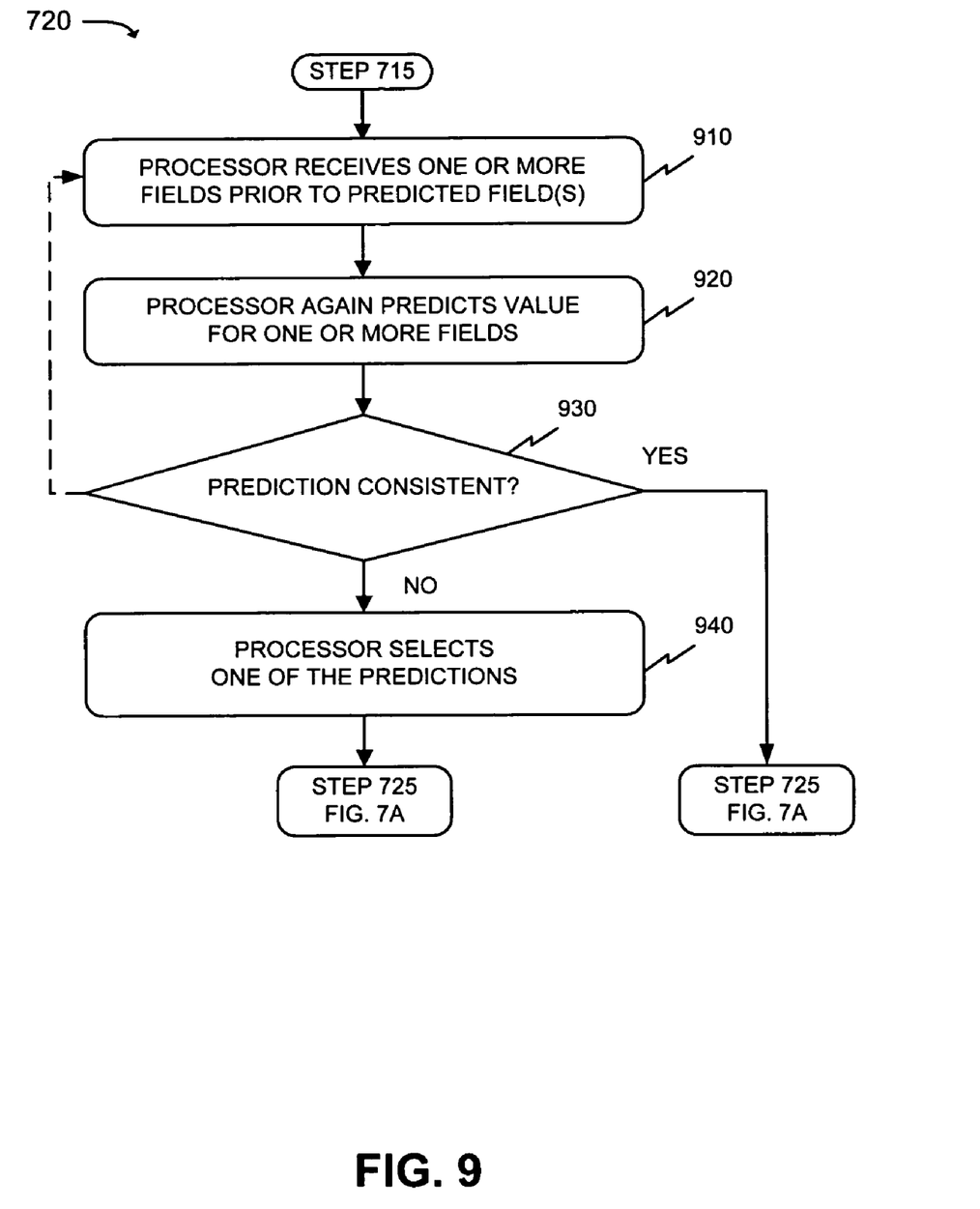
FIG. 9 is a flowchart of processing for reconfirming predictions according to an implementation consistent with the present invention.

FIG. 9 is a flowchart of processing for reconfirming predictions according to an implementation consistent with the present invention. The processor 220 receives one or more fields prior to the predicted field(s) (i.e., one or more additional fields that are received before the processor 220 receives the predicted field(s)) [step 910]. The processor 220 may again predict the value for one or more of the predicted fields based on the values in the received fields [step 920]. The processor 220 may make this prediction in a manner similar to the earlier predictions.

The processor 220 may then determine whether the later predictions are consistent with the earlier predictions [step 930]. The processor 220 may make this determination multiple times (e.g., for multiple earlier-received fields). If the predictions are inconsistent, the processor 220 may select one of the predictions using, for example, predetermined selection rules [step 940]. Alternatively, the processor 220 may continue processing at step 740 (FIG. 7B). If the processor 220 selects one of the predictions or the predictions are consistent, the processor 220 may continue processing at step 725 in FIG. 7A.

Returning to FIG. 7A, the processor 220 eventually receives the actual data in fields 820 and 830 [step 725]. When the processor 220 receives the data in fields 820 and 830, the processor 220 analyzes the fields to determine whether the actual values match the predicted values [step 730]. The processor 220 may make this determination of step 730 multiple times (e.g., for each predicted field). The processor 220 may make the determination though a simple comparison of the actual and predicted values. Alternatively, the processor 220 may base its determination on a degree of match. In other words, only predicted values that differ significantly from the actual values may be considered as not matching.

If the values match, the processor 220 may continue processing of the packet [step 735]. The continued processing may entail completing and transmitting a reply packet to the destination. In addition, the processor 220 may recheck the earlier predictions.

Figure 10:
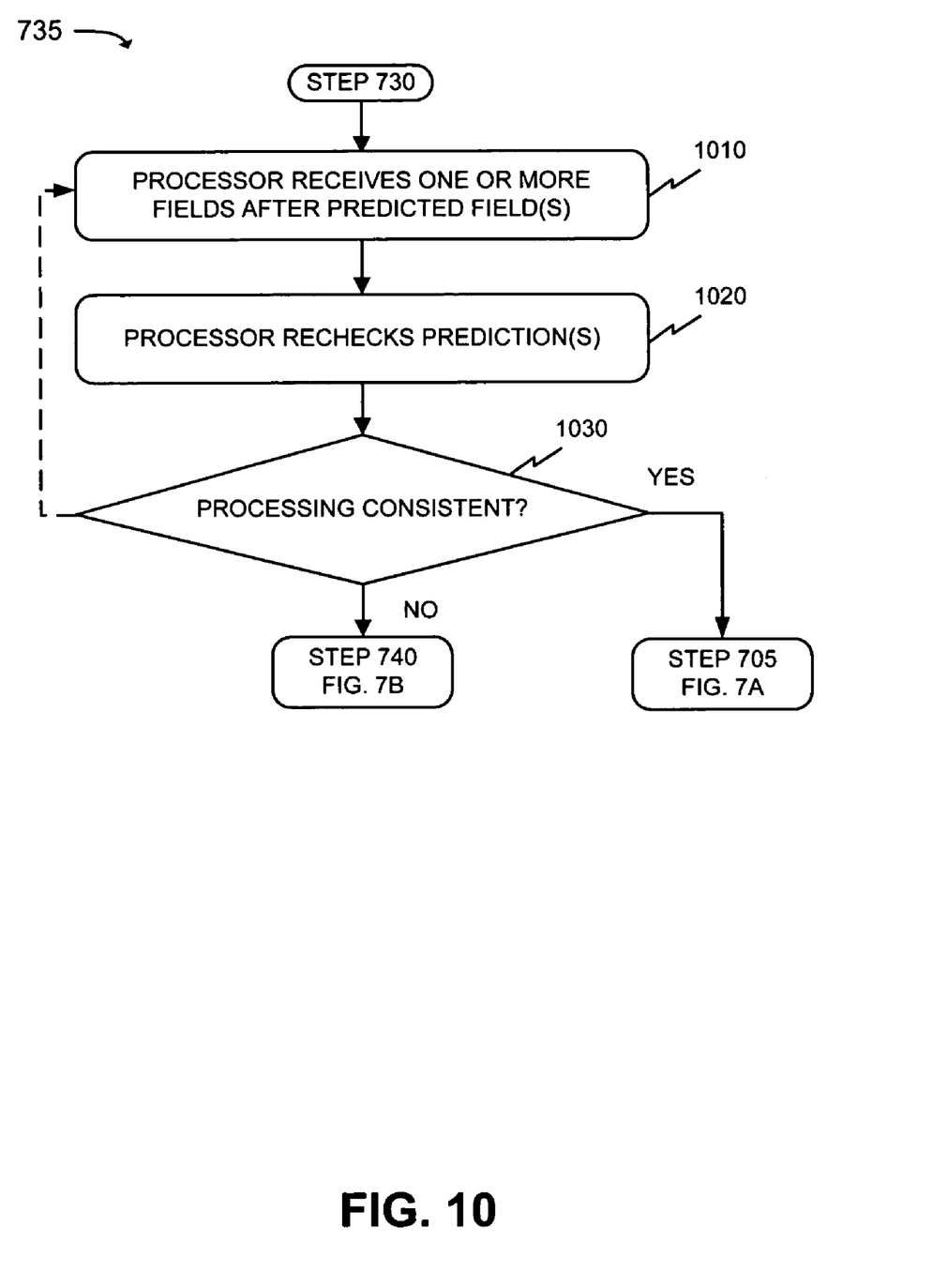
FIG. 10 is a flowchart of processing for rechecking earlier predictions according to an implementation consistent with the present invention.

FIG. 10 is a flowchart of processing for rechecking earlier predictions according to an implementation consistent with the present invention. The processor 220 receives one or more fields of the packet after the predicted field(s) (i.e., one or more fields that are received by the processor 220 after the predicted field(s)) [step 1010]. The processor 220 may recheck the earlier predictions based on the values for these later-received fields [step 1020]. For example, the processor 220 may determine whether the processing of the packet is occurring in a manner consistent with the predicted and/or actual values of the predicted fields [step 1030]. The processor 220 may make this determination multiple times (e.g., for multiple later-received fields).

If one or more processing errors are detected, the processor 220 may continue processing at step 740 in FIG. 7B. If no processing errors are detected, the processor 220 may then await arrival of the next packet and repeat processing beginning at step 705 in FIG. 7A.

Returning to FIG. 7A, if the predicted value for one or more of the fields 820 and 830 fails to match the actual value for the field(s) [step 730], the processor 220 may adjust or abort its processing of the packet [step 740] (FIG. 7B). The processor 220 may also prevent transmission of further packets that are in violation of the transport or other relevant protocol [step 745]. To prevent erroneous information from being received by the destination, the processor 220 may cause packets or packet fragments that have already been transmitted to be discarded [step 750]. The processor 220 may do this by transmitting a premature end-of-frame delimiter. This causes the network 120, or the destination, to discard the partial packet. The processor 220 may then await the end of the current packet and transfer processing to step 705 to await reception of the next packet.

CONCLUSION

Systems and methods consistent with the present invention provide mechanisms by which a communication device of limited resources can participate in communications over a network. The mechanisms permit the communication device to predict the value of certain fields in a packet before the fields are received. In this way, the communication device may efficiently use its memory resources and may respond to received packets in an expedited manner (i.e., before the packets have been completely received).

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while a series of steps have been described with regard to FIGS. 7A and 7B, the order of the steps may be changed in other implementations consistent with the present invention. In addition, in other implementations consistent with the present invention, the communication device 110 may use the value of other received fields of a packet to verify its predictions before the predicted fields are received.

Further, it has been described that the communication device 110 predicts one or more fields based on the value in one of the received fields. In other implementations consistent with the present invention, the communication device 110 makes its predictions based on the values in two or more received fields or a combination of received fields. The communication device 110 may also reconfirm predictions using one or more fields received earlier or later than the predicted fields.

The scope of the invention is defined by the claims and their equivalents.

What is claimed is:

1. A method for predicting one or more fields of a packet having a plurality of fields, each of the fields storing data representing a value, the method comprising:
   receiving one or more of the fields of the packet;
   analyzing the value of at least one of the received fields;
   predicting how the packet will be processed by upper level protocols, application protocols or both based on the value of the at least one received field and further predicting a value of at least one other field of the packet not yet received, based on the value of the at least one received field; and
   processing the packet based on the one or more received fields and the predicted at least one other field.

2. The method of claim 1, wherein the processing includes:
   generating a reply packet based on the one or more received fields and the predicted at least one other field.

3. The method of claim 1, further comprising:
   receiving the at least one other field.

4. The method of claim 3, wherein the processing includes:
   determining whether a value of the received at least one other field matches the predicted value of the predicted at least one other field.

5. The method of claim 4, further comprising:
   aborting processing of the packet when the value of the received at least one other field fails to match the predicted value.

6. The method of claim 4, further comprising:
   preventing transmission of reply information corresponding to the packet when the value of the received at least one other field fails to match the predicted value.

7. The method of claim 4, further comprising:
   causing reply information already transmitted in response to the packet to be discarded when the value of the received at least one other field fails to match the predicted value.

8. The method of claim 4, further comprising:
   continuing processing of the packet based on the one or more received fields and the received at least one other field when the value of the received at least one other field matches the predicted value.

9. The method of claim 3, wherein the processing includes:
   determining whether a value of the received at least one other field substantially matches the predicted value of the predicted at least one other field.

10. The method of claim 1, wherein the at least one received field includes a total length field and the predicted at least one other field includes a protocol field.

11. The method of claim 1, wherein the at least one received field includes a total length field and the predicted at least one other field includes a flags field.

12. The method of claim 1, wherein the at least one received field includes a total length field and the predicted at least one other field includes a protocol field and a flags field.

13. A method for predicting one or more fields of a packet having a plurality of fields, each of the fields storing data representing a value, the method comprising:
   receiving one or more of the fields of the packet;
   analyzing the value of at least one of the received fields;
   predicting a value of at least one other field of the packet not yet received, based on the value of the at least one received field;
   processing the packet based on the one or more received fields and the predicted at least one other field;
   receiving the at least one other field;
   receiving one or more additional fields of the packet after receiving the at least one other field; and
   rechecking the predicted value using the one or more additional fields.

14. A method for predicting one or more fields of a packet having a plurality of fields, each of the fields storing data representing a value, the method comprising:
   receiving one or more of the fields of the packet;
   analyzing the value of at least one of the received fields;
   predicting a value of at least one other field of the packet not yet received, based on the value of the at least one received field; and processing the packet based on the one or more received fields and the predicted at least one other field;

analyzing the value of at least one additional one of the received fields; and confirming the predicted value using the value of the at least one additional field.

15. The method of claim 14, wherein the confirming includes:

predicting another value of the at least one other field using the value of the at least one additional field, and comparing the predicted value and the other predicted value.

16. A system for predicting one or more fields of a packet having a plurality of fields, each of the fields storing data representing a value, the system comprising:

means for obtaining one of the fields of the packet;

means for determining the value of the obtained field;

means for predicting how the packet will be processed by upper level protocols, application protocols or both based on the value of the obtained field and further predicting a value of at least one other field of the packet not yet received based on the prediction of how the packet will be processed; and means for processing the packet based on at least the obtained field and the predicted at least one other fields.

17. A system for predicting one or more fields of a packet having a plurality of fields, each of the fields storing data representing a value, the system comprising: a memory configured to store instructions; and a processor configured to execute the instructions to receive one or more fields of the packet, determine the value of at least one of the received fields, predict how the packet will be processed by upper level protocols, application protocols or both based on the value of the obtained field and further predict a value of one or more other fields not yet received based on the value of the at least one received field, and process the packet based on the one or more received fields and the predicted one or more other fields.

18. The system of claim 17, wherein when processing the packet, the processor is configured to generate a reply packet based on the one or more received fields and the predicted one or more other fields.

19. The system of claim 17, wherein the processor is further configured to receive the one or more other fields.

20. The system of claim 19, wherein when processing, the processor is configured to determine whether a value of the received one or more other fields matches the predicted value.

21. The system of claim 20, wherein the processor is further configured to abort processing of the packet when the value of the received one or more other fields fails to match the predicted value.

22. The system of claim 20, wherein the processor is further configured to prevent transmission of reply information in response to the packet when the value of the received one or more other fields fails to match the predicted value.

23. The system of claim 20, wherein the processor is further configured to cause reply information already transmitted in response to the packet to be discarded when the value of the received one or more other fields fails to match the predicted value.

24. The system of claim 20, wherein the processor is further configured to continue processing of the packet based on the one or more received fields and the received one or more other fields when the value of the received one or more other fields matches the predicted value.

25. The system of claim 19, wherein when processing, the processor is configured to determine whether a value of the received one or more other fields substantially matches the predicted value.

26. The system of claim 17, wherein the at least one received field includes a total length field and the predicted one or more other fields include a protocol field and a flags field.

27. A system for predicting one or more fields of a packet having a plurality of fields, each of the fields storing data representing a value, the system comprising:

a memory configured to store instructions; and a processor configured to execute the instructions to receive one or more fields of the packet, determine the value of at least one of the received fields, predict a value of one or more other fields not yet received based on the value of the at least one received field, and process the packet based on the one or more received fields and the predicted one or more other fields, the processor further configured to receive one or more additional fields of the packet after receiving the one or more other fields and recheck the predicted value using the one or more additional fields.

28. A system for predicting one or more fields of a packet having a plurality of fields, each of the fields storing data representing a value, the system comprising: a memory configured to store instructions; and a processor configured to execute the instructions to receive one or more fields of the packet, determine the value of at least one of the received fields, predict a value of one or more other fields not yet received based on the value of the at least one received field, and process the packet based on the one or more received fields and the predicted one or more other fields;

the processor further configured to analyze the value of at least one additional one of the received fields and confirm the predicted value using the value of the at least one additional field.

29. The system of claim 28, wherein when confirming, the processor is configured to predict another value of the one or more additional fields using the value of the at least one additional field and compare the predicted value and the other predicted value.

30. A computer-readable medium embodied in a tangible form that stores instructions executable by one or more processors to perform a method for predicting at least one field of a packet, the packet including a plurality of fields, the computer-readable medium comprising:

instructions for obtaining one or more of the fields of the packet;

instructions for predicting how the packet will be processed by upper level protocols, application protocols or both based on the value of the obtained field and further predicting at least one other field based on at least one of the one or more obtained fields before the at least one other field is received; and instructions for processing the packet based on the one or more obtained fields and the predicted at least one other field.

31. The computer-readable medium of claim 30, wherein the instructions for processing include:

instructions for generating a reply packet based on the one or more obtained fields and the predicted at least one other field.

32. The computer-readable medium of claim 31, further comprising: instructions for obtaining the at least one other field.

33. The computer-readable medium of claim 32, wherein the instructions for processing include:
   instructions for determining whether the obtained at least one other field matches the predicted at least one other field.

34. The computer-readable medium of claim 33, further comprising:
   instructions for aborting processing of the packet when the obtained at least one field fails to match the predicted at least one other field.

35. The computer-readable medium of claim 33, further comprising:
   instructions for preventing transmission of reply information in response to the packet when the obtained at least one field fails to match the predicted at least one other field; and
   instructions for causing reply information already transmitted in response to the packet to be discarded when the obtained at least one field fails to match the predicted at least one other field.

36. The computer-readable medium of claim 33, further comprising:
   instructions for causing reply information already transmitted in response to the packet to be discarded when the obtained at least one field fails to match the predicted at least one other field.

37. The computer-readable medium of claim 33, further comprising:
   instructions for continuing processing of the packet based on the one or more obtained fields and the predicted at least one other field when the obtained at least one other field matches the predicted at least one other field.

38. The computer-readable medium of claim 30, wherein the at least one obtained field includes a total length field and the predicted at least one other field includes a protocol field.

39. The computer-readable medium of claim 30, wherein the at least one obtained field includes a total length field and the predicted at least one other field includes a flags field.

40. The computer-readable medium of claim 30, wherein the at least one obtained field includes a total length field and the predicted at least one other field includes a protocol field and a flags field.

41. A computer-readable medium embodied in a tangible form that stores instructions executable by one or more processors to perform a method for predicting at least one field of a packet, the packet including a plurality of fields, the computer-readable medium comprising:
   instructions for obtaining one or more of the fields of the packet;
   instructions for predicting at least one other field based on at least one of the one or more obtained fields before the at least one other field is received;
   instructions for processing the packet based on the one or more obtained fields and the predicted at least one other field;
   instructions for obtaining one or more additional fields of the packet after obtaining the at least one other field; and
   instructions for rechecking the predicted at least one other field using the one or more additional fields.

42. A computer-readable medium embodied in a tangible form that stores instructions executable by one or more processors to perform a method for predicting at least one field of a packet, the packet including a plurality of fields, the computer-readable medium comprising:
   instructions for obtaining one or more of the fields of the packet;
   instructions for predicting at least one other field based on at least one of the one or more obtained fields before the at least one other field is received;
   instructions for processing the packet based on the one or more obtained fields and the predicted at least one other field;
   instructions for analyzing at least one additional one of the obtained fields; and
   instructions for confirming the predicted at least one other field using the at least one additional field.

43. The computer-readable medium of claim 42, wherein the instructions for confirming include:
   instructions for predicting again the at least one other field using the at least one additional field, and
   instructions for comparing the at least one other field predicted using the at least one additional field to the at least one other field predicted based on the at least one obtained field.

44. A method for replying to packets that have a plurality of fields, before the packets are entirely received, comprising:
   receiving one or more fields of a packet;
   predicting how the packet will be processed by upper level protocols, application protocols or both based on the value of at least one of the received fields and further predicting one or more other fields of the packet before the one or more other fields are received;
   generating a reply packet based on the one or more received fields and the predicted one or more other fields; and
   transmitting the reply packet.

45. The method of claim 44, wherein the predicting includes:
   predicting the one or more other fields using at least one of the one or more received fields.

46. The method of claim 44, further comprising:
   receiving the one or more other fields; and
   determining whether the received one or more other fields match the predicted one or more other fields.

47. The method of claim 46, further comprising:
   preventing further transmission of the reply packet when the received one or more other fields fail to match the predicted one or more other fields.

48. The method of claim 46, further comprising:
   causing the transmitted reply packet to be discarded when the received one or more other fields fail to match the predicted one or more other fields.

49. A system for replying to packets that have a plurality of fields, before the packets are completely received, comprising:
   a memory configured to store instructions for obtaining one or more fields of a packet, predicting how the packet will be processed by upper level protocols, application protocols or both based on the value of at least one of the obtained fields and further predicting one or more other fields of the packet before the one or more other fields are obtained, generating a reply packet based on the one or more obtained fields and the predicted one or more other fields, and transmitting the reply packet; and
   a processor configured to execute the instructions in the memory.

50. The system of claim 49, wherein the instructions for predicting include:
   instructions for predicting the one or more other fields using at least one of the one or more obtained fields.

51. The system of claim 49, wherein the memory is further configured to store instructions for obtaining the one or more other fields and determining whether the obtained one or more other fields substantially match the predicted one or more other fields.

52. The system of claim 51, wherein the memory is further configured to store instructions for preventing further transmission of the reply packet when the obtained one or more other fields fail to substantially match the predicted one or more other fields.

53. The system of claim 51, wherein the memory is further configured to store instructions for causing the transmitted reply packet to be discarded when the obtained one or more other fields fail to substantially match the predicted one or more other fields.

54. A computer-readable medium embodied in a tangible form that stores instructions executable by one or more processors to perform a method for generating responses to packets having a plurality of fields, before the packets are entirely received, the method comprising:
- receiving one or more fields of a packet;
- predicting how the packet will be processed by upper level protocols, application protocols or both based on the value of at least one of the received fields and further predicting one or more other fields of the packet before the one or more other fields are received; and
- generating a reply packet based on the one or more received fields and the predicted one or more other fields.

55. A method for processing packets having a plurality of fields, comprising:
- receiving one or more fields of a packet;
- determining a value associated with at least one of the received fields;
- predicting how the packet will be processed by upper level protocols, application protocols or both based on the value of the at least one received fields and further predicting a value of one or more other fields of the packet based on the value of the at least one received field before the one or more other fields are received; and
- generating a reply packet based on the one or more received fields and the predicted one or more other fields.

56. A method for predicting a protocol field or a flags field of a packet, comprising:
- receiving a plurality of fields of the packet, one of the fields including a total length field;
- analyzing a value of data stored in the total length field;
- predicting a value of data stored in the protocol field or the flags field based on the value of the total length field before the protocol field or flags field is received; and
- processing the packet based on the received fields and the predicted protocol field or flags field.

57. A device that predicts one or more fields of a packet having a plurality of fields, each of the fields storing data representing a value, the device comprising:
- logic configured to receive one or more fields of the packet;
- logic configured to determine the value of at least one of the received fields;
- logic configured to predict how the packet will be processed by upper level protocols, application protocols or both based on the value of the at least one of the received fields and further predict a value of one or more other fields based on the value of the at least one received field before the one or more other fields are received; and
- logic configured to process the packet based on the one or more received fields and the predicted one or more other fields.

* * * * *